United States Patent [19]

Baba

[11] Patent Number: 5,111,348
[45] Date of Patent: May 5, 1992

[54] MAGNETIC HEAD INCLUDING THERMOELECTRIC POSITIONING MEANS

[75] Inventor: Hiroshi Baba, Kanagawa, Japan

[73] Assignee: Mitsubishi Denki Kabushiki Kaisha, Tokyo, Japan

[21] Appl. No.: 44,433

[22] Filed: Apr. 30, 1987

[30] Foreign Application Priority Data

May 2, 1986 [JP] Japan .................. 61-67070[U]

[51] Int. Cl.⁵ .............................. G11B 5/596
[52] U.S. Cl. ........................ 360/77.06; 360/75; 360/77.02; 360/109; 318/634
[58] Field of Search ............ 360/77, 109, 121, 107, 360/78, 104, 105, 106, 107, 109, 110, 103, 77.01, 77.01-77.08, 77.11-77.17, 78.01-78.09, 78.11-78.15; 310/306; 318/634

[56] References Cited

U.S. PATENT DOCUMENTS

| | | | |
|---|---|---|---|
| 4,164,781 | 8/1979 | Brown | 360/77 |
| 4,374,402 | 2/1983 | Blessom et al. | 360/104 |
| 4,583,135 | 4/1986 | Kimura | 360/77 |
| 4,814,908 | 3/1989 | Schmitz | 360/77.02 |

FOREIGN PATENT DOCUMENTS 59-203272  11/1984  Japan .................. 360/77.03

Primary Examiner—Aristotelis Psitos
Assistant Examiner—Steven R. Garland
Attorney, Agent, or Firm—Dykema Gossett

[57] ABSTRACT

A thermoelectrically adjustable magnetic head for reading and writing information comprising a read/write core, and position detection cores on both sides thereof generating compensatory output in proportion to the relative positional drift of the magnetic head with position detection and correction device from the center lines of a magnetic disk data tracks by feeding back signals to the magnetic head to rectify said magnetic head's position to the center of said disk data tracks, and in the course of such compensatory operation also eliminates noise generated at the time of recording from the gaps between said tracks.

3 Claims, 5 Drawing Sheets

MAGNETIC HEAD INCLUDING THERMOELECTRIC POSITIONING MEANS

BACKGROUND OF THE INVENTION

1. Field of the Invention

This invention relates to a thermoelectrically adjustable magnetic head used in the magnetic reading and writing device, and its position determining mechanism.

2. Description of the Prior Art

FIG. 5 is a perspective view of a conventional magnetic head. This drawing shows that the magnetic head 1 comprises a slider 2 and a supporting spring 4. On the slider 2 is formed a read/write core 3 which reads and writes information. The supporting spring 4 pressingly retains the slider 2.

FIG. 6 is a schematic showing the structure of a magnetic disk device or a magnetic read/write device using the magnetic head of FIG. 5. The magnetic head 1 is retained on a carriage 5, and moves in the direction of a radius over a magnetic disks 6. A spindle motor 7 retains and rotates the magnetic disks 6 at a predetermined number of revolutions forming concentric plural data tracks thereon. A motor 8 moves the carriage 5 in the radial direction over the magnetic disks 6. A base 9 retains the carriage 5, spindle motor 7, and the motor 8.

The combined actions of the conventional magnetic head 1 shown in FIG. 5 and the magnetic disk device shown in FIG. 6 are as follows: Information is written in and read from a plural number of concentric data tracks on the magnetic disks 6 which are formed by the movement of the magnetic head 1 in the radial direction over the magnetic disks 6 which is driven at a predetermined number of revolutions by the spindle motor 7. The carriage 5 enables the magnetic head 1 to move onto an optional data track and make random access to any recorded data thereon.

At least one of the plural number of magnetic disks 6 is often used as positional information surface (or servo surface) for determining the positional standard for the magnetic head 1 for its movement in the radial direction over the magnetic disks 6. This is generally called the servo surface servo method, and the relative positions of the magnetic head 1 and the radial direction of the magnetic disks 6 are determined according to the positional information detected from the servo surface by a magnetic segment of the magnetic head 1 used for said purpose.

Meanwhile, the magnetic head of this kind using servo surface servo system is known as IBM Technical Disclosure Bulletin, Vol. 20, No. 8 of January 1978 issue titled "Sector Servo Method" (P3243-P3247) and also Vol. 23, No. 2 of July 1980 issue titled "Track-Locating and Following Apparatus for a Flexible Disk File" (P738-P742). The magnetic head of this kind is provided with servo information along the data on the magnetic disks whereby the servo information together with data signals is read by single transducer of signal pickup use, amplified, provided to a compensator and power driver by separating the position error signal from the data and then, the moving coil actuator is driven to hold said transducer on desired data tracks.

The magnetic head and magnetic disk device being constructed as above, the variation in the factors of exterior environment, such as temperature and the like, will cause thermal and/or mechanical distortions inducing the magnetic head 1 drift away from the center of the data tracks to result in reduced reliability in recording and reproducing information.

Although the prior art may provide a transducer for picking up servo information, it will result in a very complicated mechanism, and since a servo drive must be controlled by a motor using a moving coil the device may not be so reasonably priced as to be practical.

SUMMARY OF THE INVENTION

An object of this invention is therefore to provide a thermoelectrically adjustable magnetic head with position detection and correction means which is capable of detecting and correcting the positional drift of each segment thereof in relation to the center of the data tracks.

The magnetic head of this invention is provided with position detection cores on each side of the read/write core.

The position detection cores detect the relative positional drift of each segment of the magnetic core from the center of the data tracks and induce said read/write core to move back on said center in compensation of said drift and to enhance the reliability of reading and writing information.

DETAILED DESCRIPTION

The object of this invention is to provide a thermoelectrically adjustable magnetic head with position detection and correction means that may detect and compensate the positional drift of each read/write segment of the magnetic head in relation to the center of data tracks.

The magnetic head of this invention has cores for detecting the position of magnetic segments in relation to the center of the data tracks additionally installed on each side of the read/write core.

Said position detection cores detect the relative positional drift of each magnetic segment of the magnetic head from the center of the data tracks, and induce the read/write core to move back to the center of the data tracks in compensation of the drift to enhance the reliability of reading and writing information.

Figure 1:
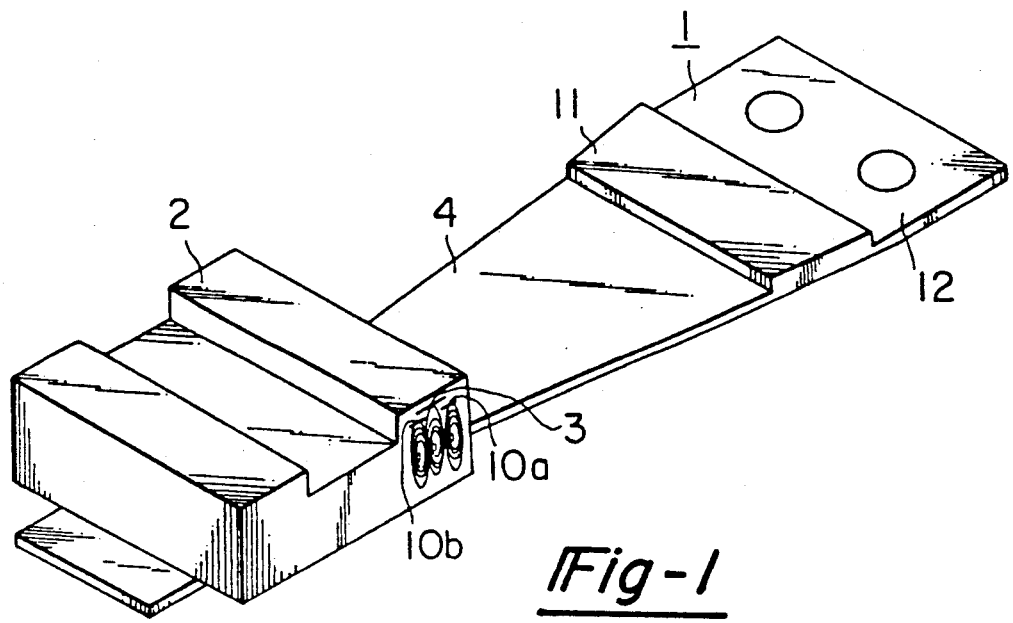
FIG. 1 is a perspective view of the magnetic head embodying the present invention.
Figure 2:
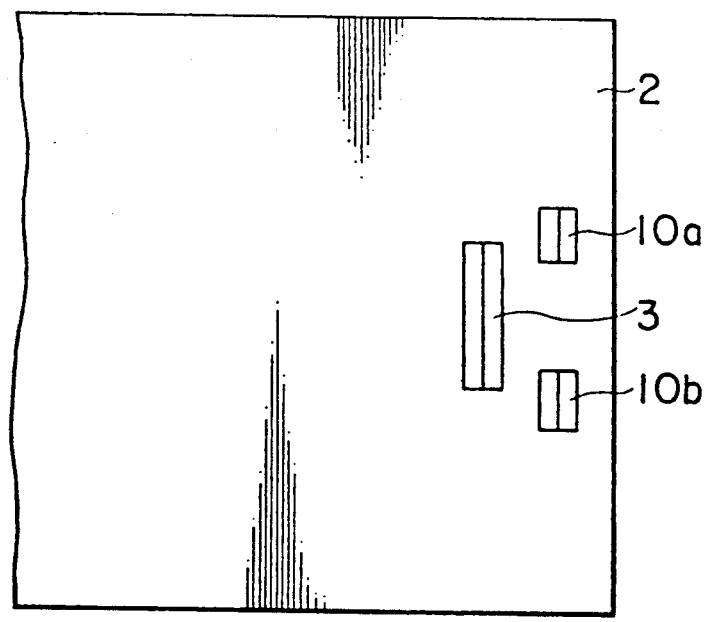
FIG. 2 is the enlarged view of the vital portion of the magnetic head seen in FIG. 1.

The magnetic head of which perspective view is shown in FIG. 1, and its enlarged portion in FIG. 2, is an embodiment of this invention. In these drawings, the magnetic head 1 comprises the slider 2 and support spring 4 both of which are connected by the position detection/compensation mechanism 11 with the retaining part 12. On the slider 2 are formed the read/write core 3 which reads and writes information, and the position detection cores 10a and 10b which are respectively installed on either side of the read/write core 3.

Figure 3:
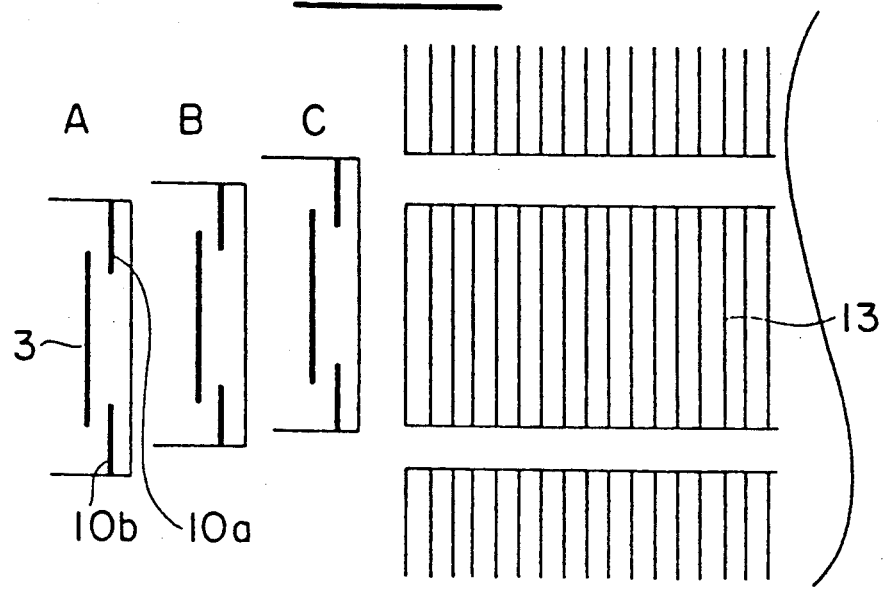
FIG. 3 is a diagrammatic illustration of the variation in output of the position detection core reflecting the position of the magnetic head in relation to the data tracks.
Figure 3A:
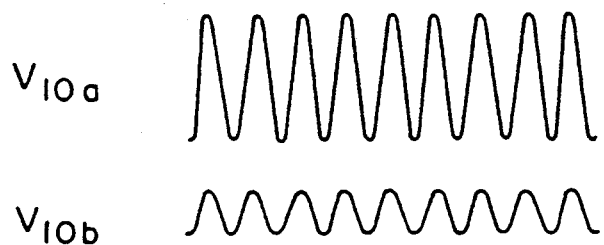
FIG. 3A shows the relative strength of the signals from the position detect cores when the read/write core is in the position A shown in FIG. 3.
Figure 3B:
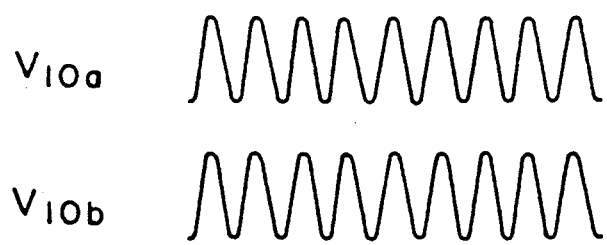
FIG. 3B shows the relative strength of the signals from the position detection cores when the read/write core is in position B shown in FIG. 3.
Figure 3C:
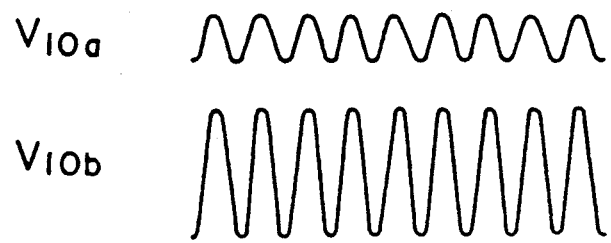
FIG. 3C shows the relative strength of the signals from the position detection cores when the read/write core is in position C of FIG. 3.

FIG. 3 illustrates the variation in the output from the position detection core in response to the position of the magnetic head over the data tracks as shown in FIG. 1. The data tracks 13 are formed on the magnetic disks 6 by means of the read/write core 3. The A, B, and C indicate relative positions of the data tracks 13, read/write core 3, and position detection cores 10a and 10b, respectively. The $V_{10a}$ and $V_{10b}$ indicate the respective read output from the position detection core 10a and 10a when they are in the positions of A, B, and C respectively. When the cores are in the position of B, which is in the center of the data tracks 13, the respective read outputs will be $V_{10a} = V_{10b}$, as shown in FIG. 3B. The degree of positional drift of the magnetic head 1 from the center of the data tracks is detected by comparing the read output of $V_{10a}$ and $V_{10b}$, for example, as shown in FIGS. 3 and 3A when the position of the read/write core 3 is below the data track 13, the signal strength $V_{10b}$ will be less than the signal strength $V_{10a}$, while when the read/write core is in position C shown in FIG. 3, i.e, above the data track 13, the signal strength $V_{10a}$ is less than the signal strength $V_{10b}$.

Figure 4:
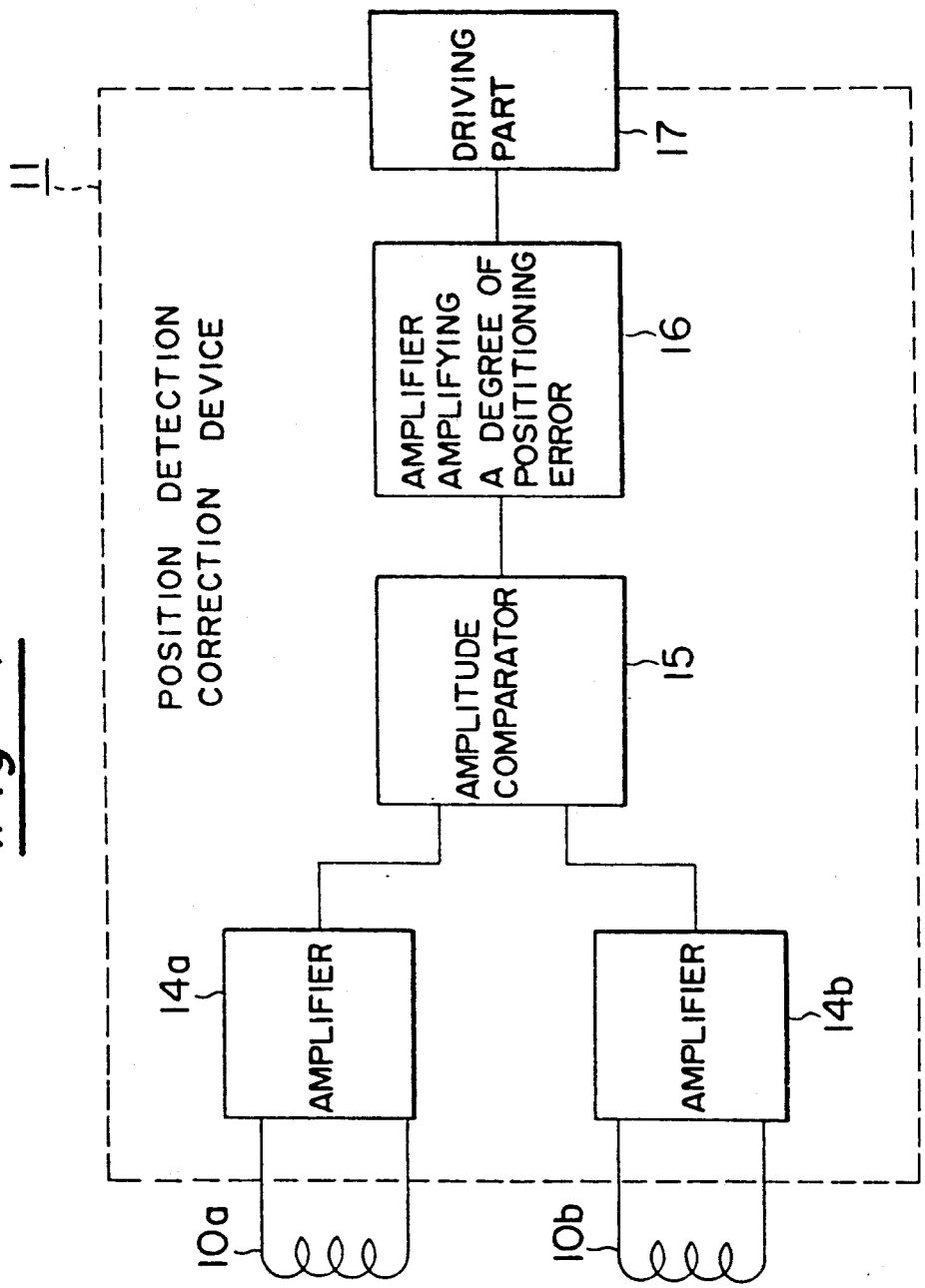
FIG. 4 is a block diagram illustrating the position detection and compensation mechanism of the magnetic head.
Figure 5:
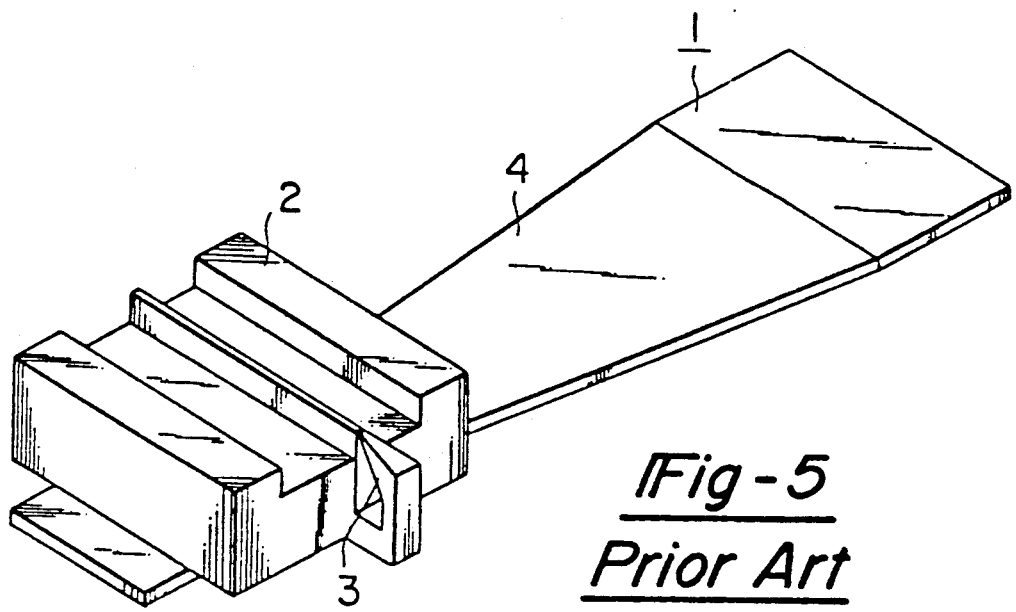
FIG. 5 is a perspective view of a magnetic head of prior art.
Figure 6:
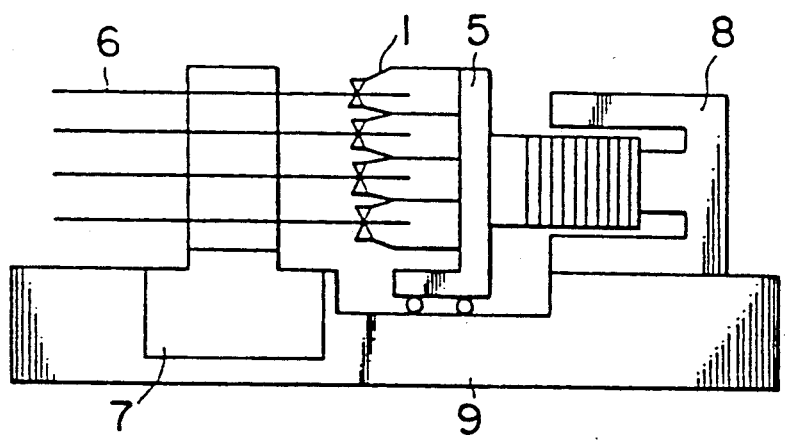
FIG. 6 is a schematic structural illustration of the magnetic disk device, or the magentic read/write device using the magnetic head of FIG. 5.
Figure 7:
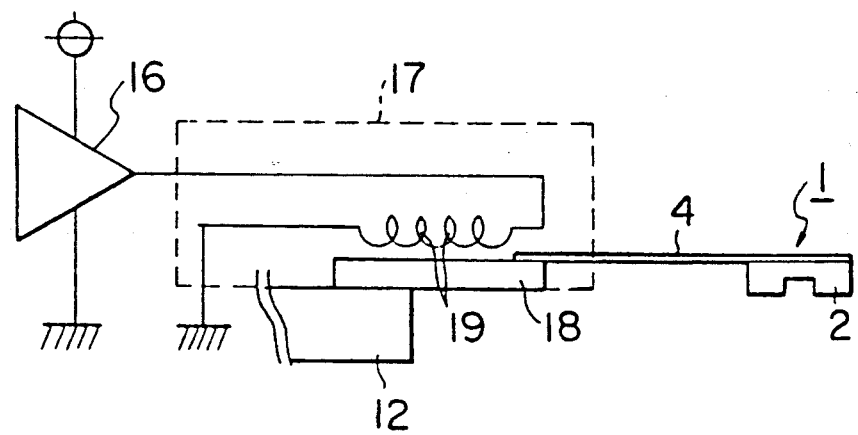
FIG. 7 is a schematic illustration of the positional drift compensation mechanism of the magnetic head.
Figure 8:
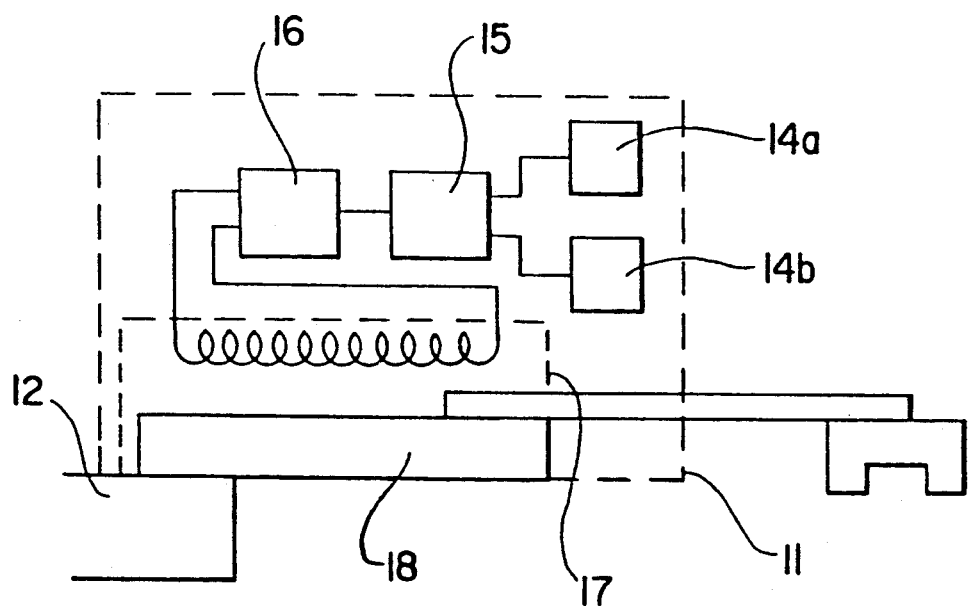
FIG. 8 illustrates in more detail the subject matter shown in FIGS. 4 and 7.

FIG. 4 illustrates the position detection compensation mechanism of the magnetic head 1. The amplifiers 14a and 14b amplify the output from the position detection cores 10a and 10b respectively; the amplitude comparator 15 detects the differential between the read outputs $V_{10a}$ and $V_{10b}$; said differential detected by the amplitude comparator 15 is then amplified by the positional drift amplifier 16; and the drive unit 17 moves the read/write core 3 and the position detection cores 10a and 10b over the data tracks 13 in accordance with the output transmitted from the position drift amplifier 16, an end part of a support spring 4 located at the magnetic head 1 is fixed to one end of a panel-like body 18 made of a metal such as steel, aluminum, and the like, which expands and contracts according to the heat given, and the other end of a panel-like body 18 is fixed to the retaining part 12, whereby the output signal from the amplifier 16 can be transmitted to a coil heater 19 provided along said panel-like body 18.

Accordingly, said coil heater 19 is heated by output signal from said amplifier 16, and the calorific power thus generated at the coil heater 19 will expand the panel-like body 18 in such a way that the slider 2 at the magnetic head 1 will be correctly positioned, and consequently, the magnetic head 1 will position itself correctly over the disk data tracks.

Accordingly, the magnetic head 1 of this invention detects the drift of each magnetic segment thereof by comparing the respective output of the position detection cores 10a and 10b, and moves the read/write core 3 onto the center of the data tracks 13 in such degree as to compensate the positional drift made by the magnetic segments. The position detection cores 10a and 10b will also eliminate the noise generated from the gaps between the data tracks 13 when the magnetic head 1 records information.

While the position detection/compensation mechanism is installed on the magnetic head 1 in above embodiment, it may be installed on the carriage 5 or on other suitable positions.

And while above embodiment is made with the magnetic disk device of a servo surface/servo method, it may be replaced with embedded servo method or open-loop method, either of which may be as effective as said embodiment.

And thus this invention has made it possible to 1) enhance the reliability in reading/writing information, and 2) easily produce a magnetic disk device of a high track density by additionally installing on both sides of the read/write core the position detection cores which are capable of making positional compensation on individual magnetic head segments when a relative positional drift arises between the position information detection magnetic head segment and read/write magnetic head segments when environmental changes, such as temperature changes, take place.

What is claimed is:

1. A magnetic head with position correction and detection means for reading and writing information including a slider having a read/write core provided with position detection cores at both right and left sides thereof which overlap said read/write core, and including thermo electric means for heating and cooling a portion of said magnetic head to cause movement of said magnetic head over a magnetic disk.

2. A magnetic head in combination with a position detection and correction servo drive unit, including:
   (a) a base;
   (b) a carriage motor mounted on said base;
   (c) a carriage mounted for reciprocal movement by said carriage motor, said reciprocal movement being in a radial direction with respect to a disk;
   (d) a spindle motor mounted on said base;
   (e) a spindle rotated by said spindle motor, said spindle capable of rotating at least one magnetic disk;
   (f) at least one thermoelectrically adjustable magnetic head having a longitudinal axis mounted on said carriage to engage a magnetic disk, said longitudinal axis of said magnetic head being coaxial with said radial direction with respect to a disk, said thermoelectrically adjustable magnetic head thereby being thermoelectrically adjustable in said radial direction, with respect to a disk, wherein said thermoelectrically adjustable magnetic head includes:
      (i) a holding part;
      (ii) a position detection correction device mounted to said holding part and including a drive unit;
      (iii) a support spring mounted to said position detection correction device; and
      (iv) a slider mounted to said support spring, wherein said slider includes a read/write core; and a position detection core mounted on each side of said read/write core proximate thereto; and wherein said drive unit includes:
         (a) a panel-like body interposed between said holding part and said support spring; and (b) a heater to selectively heat and cool said panel-like body to cause movement of said magnetic head over said magnetic disk.

3. A magnetic head with a position detection and correction means including: a drive unit, said drive unit including a panel-like body interposed between a holding part and a support spring: a heater to selectively heat and cool said panel-like body to cause movement of said magnetic head over a magnetic disk; and further comprising:

(i) a position detection correction device connected to said holding part to cause movement of said magnetic head in an axial direction;
(ii) said support spring being connected to said position detection correction device; and
(iii) a slider mounted to said support spring and including a read/write core; and a position detection core mounted on each side of said read/write core proximate thereto.

* * * * *